Patented Sept. 23, 1952

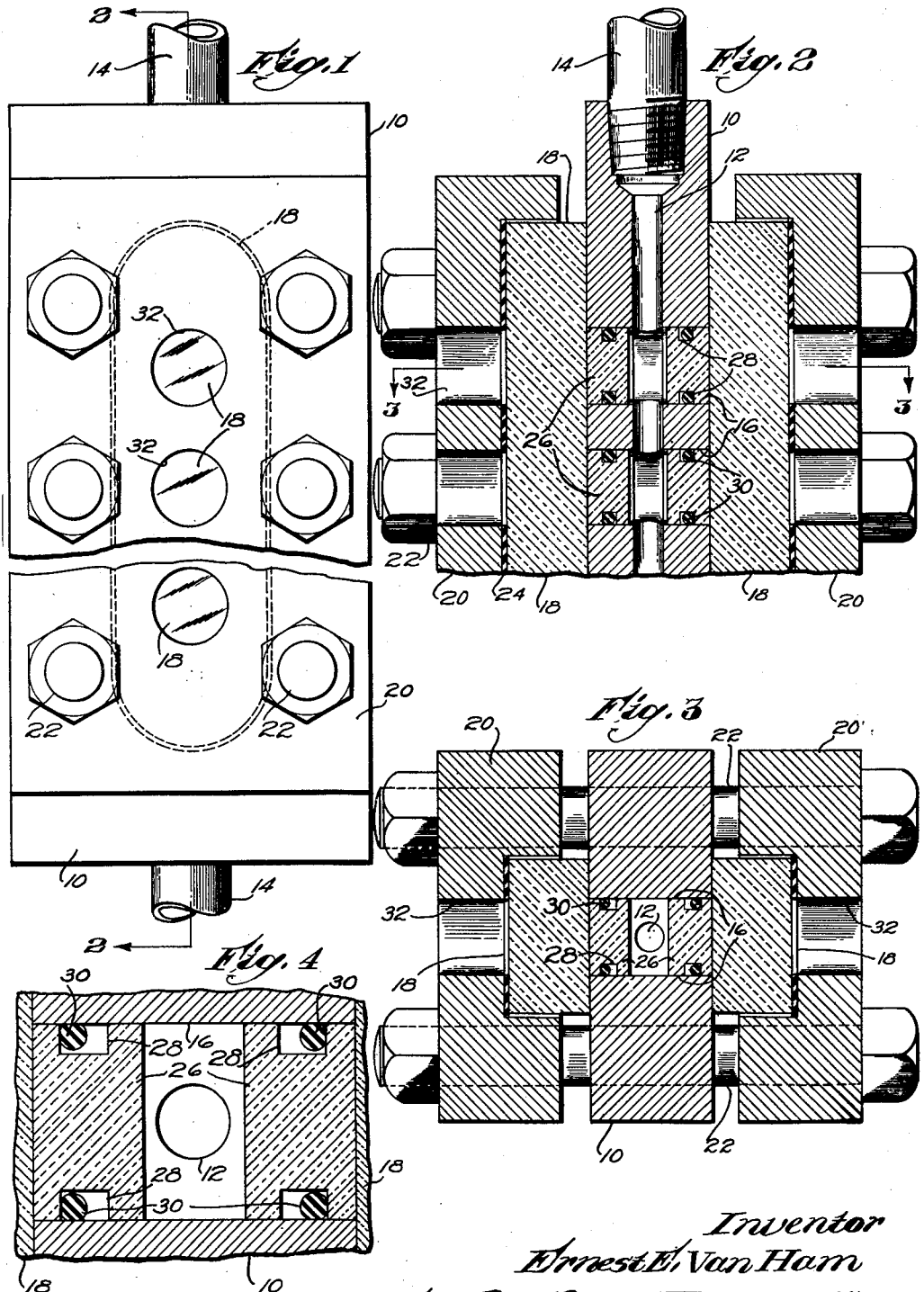

2,611,271

UNITED STATES PATENT OFFICE 2,611,271

LIQUID LEVEL GAUGE

Ernest E. van Ham, Somerville, Mass., assignor to Jerguson Gage & Valve Company, Somerville, Mass., a corporation of Massachusetts Application April 21, 1950, Serial No. 157,229

4 Claims. (Cl. 73—331)

This invention relates to devices for use with liquid containers whereby interior conditions in a container, which may in turn be indicative of conditions at some other location concerning which information is desired, may be directly observed by the eye. An example of such a device is a gage as used on boilers and other liquid containers to indicate the liquid level therein. In this case the level of a liquid column in the gage is observed and the level in the boiler or other container deduced therefrom. The object is to provide a simple and effective device of this type adapted to be used in installations subject to high pressures.

The gage familiar to everyone and commonly referred to as a gage glass is a simple cylindrical glass tube. This may be used for low pressures such as those of a boiler for domestic heating. It is not adapted, however, for high pressures and it has been customary to provide gages consisting of a heavy body of steel provided with a groove or slot which receives the liquid column and is closed on one or both sides, as the case may be, with a flat plate or plates of heavy glass secured by a frame or frames bolted in position. The pressures of various installations with which it is desirable to use such a gage, however, are frequently such that these constructions are unsatisfactory because of the limitations in the strength of the body itself as well as that of the glass and the difficulty in maintaining a tightly sealed joint between the glass and the gage body. The construction of the present invention overcomes these difficulties in a simple and inexpensive manner.

My invention will be well understood by reference to the following description taken in connection with the accompanying drawings of an illustrative embodiment of the invention, wherein:

Fig. 1 is a front elevation of a gage with its central portion broken away;

Fig. 2 is a vertical, longitudinal section on line 2—2 of Fig. 1;

Fig. 3 is a transverse section on line 3—3 of Fig. 2; and

Fig. 4 is an enlarged view of a portion of Fig. 3.

Referring now to the drawing, the gage there shown comprises a bar-like body 10 which is provided with a longitudinal chamber 12 to the ends of which may be connected the pipes or conduits 14 (Fig. 1) communicating with the two sources of pressure the differential of which it is desired to indicate, as, for example, the water-containing space and the steam-containing space of a high pressure boiler. The body is pierced with transverse bores 16 intersecting the central chamber 12 at a multiplicity of points so that the water level in the chamber may be observed through one of these bores substantially continuously along the length of the vertical bore. Herein these transverse bores are arranged in a single vertical aligned row although this is not necessary. The gage here shown may be read from either side so the bores 16 extend completely through the body opening to either face of the same as seen in Fig. 2.

Overlying each face of the body and covering a plurality of the bores, herein the entire series, is a flat glass 18 of the type hitherto used, which is secured against the face of the body 10 by a frame member 20 secured by bolts 22, the usual cushion 24 being interposed between the frame and the outer face of the glass 18.

In each of the bores 16 there is received a transparent member 26, the outer face of which bears against the inner face of the glass 18 and is supported thereby so that the glass prevents these transparent members from being displaced from the bores. Herein the bore is cylindrical in the more limited sense of the word (a right circular cylinder) and so is the transparent member, or, more generically described, the two are parallel-sided. That is, any element of their lateral surfaces is parallel to any other element. The bores 16 may be reamed and the transparent elements are formed to a close tolerance on their outside diameters so that they will slide nicely into the transverse bores. In the wall of each transparent member 26 is a circumferential groove 28 in which is seated a packing ring 30 which is thus interposed between the wall of the transparent member and the encircling wall of the bore 16 and is located in a plane between the inner and outer faces of the former. Certain packings commercially available for use in sealing a joint between two cylindrical members, one of which is received in the other in the manner of a bell and spigot joint and which are formed of a rubber composition, are suitable.

When the parts are circular as shown, the packings 30 in their normal unstressed condition may take the form of a circular annulus, conveniently circular in cross section. They may be slightly stretched and snapped into the grooves 28, the width of which is desirably slightly greater than the diameter of the rings. The internal diameter of the rings may be somewhat greater than the bottom diameter of the groove and their external diameter only slightly more than that of the transparent members, say about .015 of an inch, so that the packing rings are very slightly compressed when the transparent members are in position. I have not attempted to illustrate this in Figs. 2 and 3 because of their small scale, but in Fig. 4, which is on a larger scale, the construction is somewhat diagrammatically illustrated. It will be apparent that pressure from the interior chamber 12 of the gage will act upon the internal and inward semi-circumferences of the cross section of the packing ring and tend to thrust the same into the angle formed between the wall of the bore and the exterior wall of the groove. An effective joint is obtained.

In gages of the flat glass type as previously constructed, any movement of the glass 18 away from the body of the gage, either because of stretching of the retaining bolts 22 or compression of the gaskets 24 between the glass and the clamping frames, is likely to open up joints and cause leakage. In the present example if the bolts stretch and the glass moves outwardly slightly, the transparent members 26 may follow the same, but the packings 30 between the transparent members and the bores 16 which receive them, are unaffected. Consequently, even with heavy pressures, the gage may be perfectly tight and the bolts 22 need be set up only with moderate tightness as by means of the fingers or a small wrench, in order to secure effective sealing of the instrument.

The transparent members 26 may be made of glass similar to that used for the glass 18. When the temperatures involved permit transparent resins such as the methyl methacrylate resin known by the trade name Lucite may be used.

I have referred to the member 20 as a frame. Conveniently, and to contribute to its strength, it may be a bar provided with separate sight openings 32 as distinguished from a longitudinal slot substantially coextensive with the height of the gage, each of the sight openings disclosing at most a few of the transverse bores 16, there being herein shown single openings which in use are aligned with the individual bores 16.

By virtue of the construction the body 10 is strongly reinforced by the webs binding together the two sides between the locations of the transverse bores 16. The packing is effective and the pressure on the glass much diminished so that breakage of the glass under excessive pressure is avoided.

I am aware that the invention may be embodied in other specific forms without departing from the spirit or essential attributes thereof, and I therefore desire the present embodiment to be considered in all respects as illustrative and not restrictive, as is in fact clear in several matters from the description itself. Reference is to be had to the appended claims to indicate those principles of the invention exemplified by the particular embodiment described and which I desire to secure by Letters Patent.

I claim:

1. A gage of the type described suitable for high pressure, comprising a bar-like body having a longitudinal chamber and openings at each end thereof for admission of pressure fluid to the chamber, the body also having a parallel-sided opening from said chamber through a side face of the body, a glass overlying the face and covering the opening therein, a frame retaining the glass against said face, a parallel-sided transparent member fitting said opening and exteriorly supported by the inner face of the glass, and a packing ring between the apposed sides of the opening and transparent member one of which sides is cut away inwardly of its outer face to provide a seat for the ring.

2. A gage of the type described suitable for high pressure, comprising a bar-like body having a longitudinal chamber for communication at each end with sources of pressure, the body having a multiplicity of transverse bores opening from a face of the body to the chamber along the length of the latter, a glass overlying said face and covering a plurality of the bores, a frame retaining the glass against said face, transparent elements fitting the bores and exteriorly supported by the inner face of the glass, and packings for said transparent members each interposed between the apposed sides of a member and a bore and located between the inner and outer faces of the member.

3. A liquid container having a series of openings through the wall thereof, a glass covering the openings, individual transparent members received in the openings and exteriorly supported by the glass and packings for each of said members interposed between its periphery and the encircling wall of the opening receiving the same and located between the inner and outer faces of the member.

4. A liquid container having an opening in its wall to provide for direct inspection of the interior, a transparent member fitting said opening, a glass overlying said member and a portion of the exterior face of the container and means for securing said glass in position to retain the transparent member from outward displacement from said opening and a packing for said member interposed between its periphery and the encircling wall of the opening which receives the same and located between the inner and outer faces of the member.

ERNEST E. van HAM.

REFERENCES CITED

The following references are of record in the file of this patent:

UNITED STATES PATENTS

| Number | Name | Date |
| --- | --- | --- |
| 1,380,080 | Sargent | May 31, 1921 |
| 2,065,705 | Jerguson | Dec. 29, 1936 |